(12) United States Patent
Klaver

(10) Patent No.: US 8,079,724 B1
(45) Date of Patent: Dec. 20, 2011

(54) COMBINED SPOTLIGHT CAUTION LIGHT APPARATUS

(76) Inventor: Curtis D. Klaver, Dorr, MI (US)

( * ) Notice: Subject to any disclaimer, the term of this patent is extended or adjusted under 35 U.S.C. 154(b) by 281 days.

(21) Appl. No.: 12/496,023

(22) Filed: Jul. 1, 2009

(51) Int. Cl.
*F21V 21/30* (2006.01)
(52) U.S. Cl. ........... 362/35; 362/234; 362/249.13; 362/398; 362/493; 362/542
(58) Field of Classification Search ........... 362/35, 362/234, 249.13, 398, 489, 493, 526, 540, 362/542, 544, 549
See application file for complete search history.

(56) References Cited

U.S. PATENT DOCUMENTS

| | | | |
|---|---|---|---|
| 3,266,014 A * | 8/1966 | Leotta | ............... 362/35 |
| D266,997 S | 11/1982 | Hsue | |
| 5,195,813 A | 3/1993 | Brown | |
| 5,673,989 A * | 10/1997 | Gohl et al. | ............... 362/35 |
| 5,769,526 A | 6/1998 | Shaffer | |
| 6,183,100 B1 | 2/2001 | Suckow et al. | |
| 6,923,560 B2 | 8/2005 | Huang | |

* cited by examiner

*Primary Examiner* — Stephen F Husar
(74) *Attorney, Agent, or Firm* — Crossley Patent Law; Mark A. Crossley

(57) ABSTRACT

The combined spotlight caution light apparatus provides the advantages of both a spotlight and a caution light. Both lights are housed one above the other within the transparent circular dome. The apparatus provides the advantage of removably mounting each needed light to a vehicle, without brackets, vehicle modifications, or hardware or electrical harness invasion. The apparatus provides the advantages of rotating caution light warning. And, the apparatus separates and combines controls for the spotlight and caution light with the control within the connecting wire that plugs into the vehicle cigar lighter.

2 Claims, 5 Drawing Sheets

COMBINED SPOTLIGHT CAUTION LIGHT APPARATUS

BACKGROUND OF THE INVENTION

Caution lights and spotlights are typically needed, quite frequently, on various official vehicles which include but are not limited to road maintenance vehicles, police vehicles, snowplows, ambulances, and others. Some such vehicles are not in need of spotlights and caution lights all of the time, though, and some do not want to be recognized as service vehicles continuously. Therefore, permanent light mounts are not only expensive, but not always desirable. Some mounts also damage a vehicle. Should a fleet of vehicles exist, with only a particular number at a given time needing spotlights or emergency lights, the options of providing such are few. An additional problem is that spotlights and caution lights are typically separate, thereby requiring larger mounts and further expense. The present apparatus solves these problems with a removable combined spotlight caution light that needs no mounts or electrical wiring harness modifications of any vehicle with which the apparatus is used.

FIELD OF THE INVENTION

The combined spotlight caution light apparatus relates to vehicle caution lights and more especially to a combined spotlight caution light that removably attaches to a vehicle and plugs into a cigar lighter for power.

SUMMARY OF THE INVENTION

The general purpose of the combined spotlight caution light apparatus, described subsequently in greater detail, is to provide a combined spotlight caution light apparatus which has many novel features that result in an improved combined spotlight caution light apparatus which is not anticipated, rendered obvious, suggested, or even implied by prior art, either alone or in combination thereof.

To attain this, the combined spotlight caution light apparatus provides the advantages of both a spotlight and a caution light. Both lights are housed one above the other within the transparent circular dome. The apparatus provides the advantage of removably mounting each needed light to a vehicle, without brackets, vehicle modifications, or hardware or electrical harness invasion. The apparatus provides the advantages of rotating caution light warning. And, the apparatus separates and combines controls for the spotlight and caution light.

Thus has been broadly outlined the more important features of the improved combined spotlight caution light apparatus so that the detailed description thereof that follows may be better understood and in order that the present contribution to the art may be better appreciated.

An object of the combined spotlight caution light apparatus is provide the advantages of both a spotlight and a caution light.

An object of the combined spotlight caution light apparatus is to removably mount to a vehicle.

Another object of the combined spotlight caution light apparatus is to mount to a vehicle without brackets or vehicle modification of any kind.

A further object of the combined spotlight caution light apparatus is to require no electrical harness invasion of the vehicle An added object of the combined spotlight caution light apparatus is to provide rotating caution light warning.

And, an object of the combined spotlight caution light apparatus is to separate and combined controls for the spotlight and caution light.

These together with additional objects, features and advantages of the improved combined spotlight caution light apparatus will be readily apparent to those of ordinary skill in the art upon reading the following detailed description of presently preferred, but nonetheless illustrative, embodiments of the improved combined spotlight caution light apparatus when taken in conjunction with the accompanying drawings.

In this respect, before explaining the current embodiments of the improved combined spotlight caution light apparatus in detail, it is to be understood that the combined spotlight caution light apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved combined spotlight caution light apparatus. It is therefore important that the claims be regarded as including such equivalent constructions insofar as they do not depart from the spirit and scope of the combined spotlight caution light apparatus. It is also to be understood that the phraseology and terminology employed herein are for purposes of description and should not be regarded as limiting.

DETAILED DESCRIPTION OF THE DRAWINGS

Figure 1:
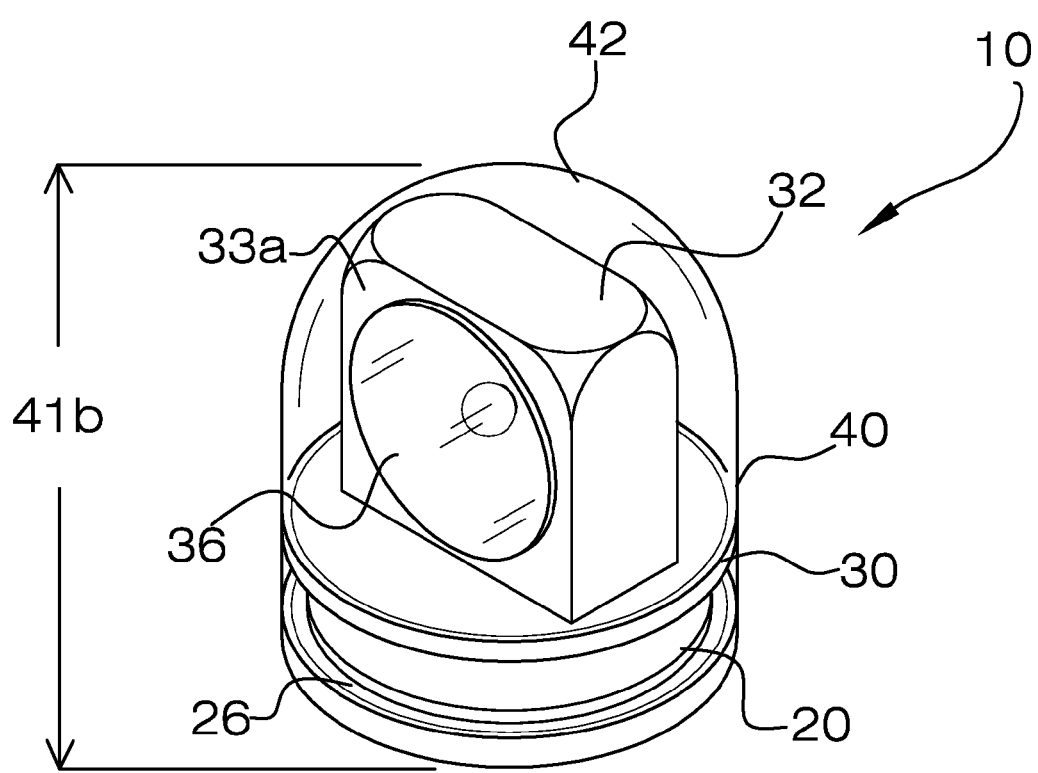
FIG. 1 is a frontal perspective view.

With reference now to the drawings, and in particular FIGS. 1 through 6 thereof, the principles and concepts of the combined spotlight caution light apparatus generally designated by the reference number 10 will be described.

Referring to FIGS. 1, 2, 4, and 5, the combined spotlight caution light apparatus 10 partially comprises the circular base 20 having a base diameter 21 of about 12 inches. The circular magnet 24 is attached below the base 20. The magnet 24 is removably affixed to an existing vehicle 12. The connecting wire 58 extends from the circular base 20. The grommet 22 reinforces the connecting wire 22 at the circular base 20. The transparent circular dome 40 has a rounded top 42 that contributes to both appearance and vehicle aerodynamics. The dome 40 is disposed atop the circular base 20. The circular dome 40 has a dome diameter 41*a* of about 12 inches to match the base diameter 21. The dome 40 has a dome height 41*b* of about 12 inches. The dome height 41*b* and the dome diameter 41*a* are important in providing adequate room within for very bright lighting while at the same time offering significant aerodynamic and appearance advantages over other light and light mount designs. The circular stationary upper base 30 is disposed within the circular dome 40. The stationary upper base 30 is spaced apart from the circular base 20. The hexahedral spotlight surround 32 is disposed atop the stationary upper base 30. The surround 32 has a surround front 33*a* spaced apart from the surround back 33*b*.

The plurality of spaced apart heat vents 34 is disposed in the surround back 33b and provides needed cooling for the spotlight 36. The spotlight 36 is disposed in the surround front 33a.

Figure 2:
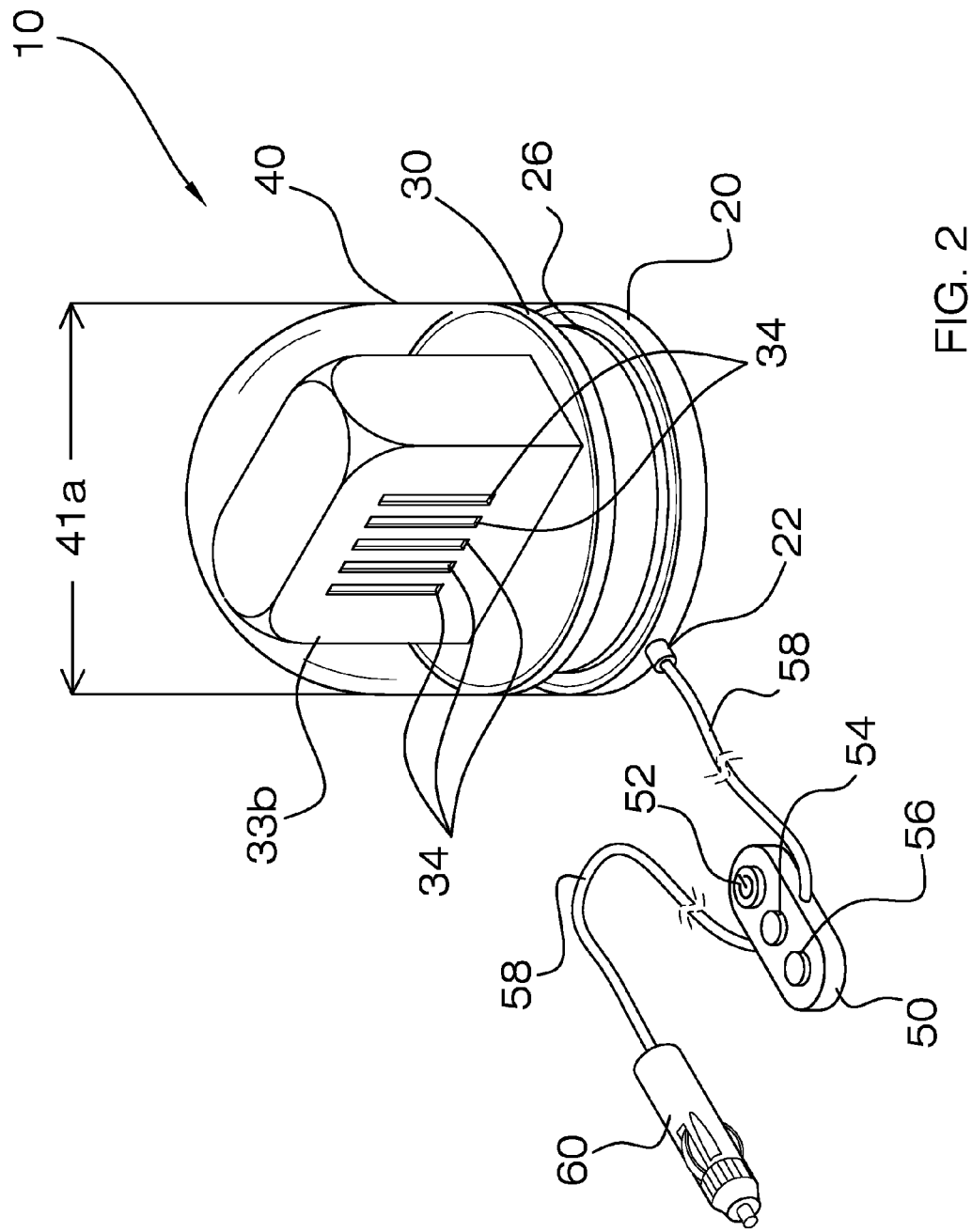
FIG. 2 is a rear perspective view.
Figure 3:
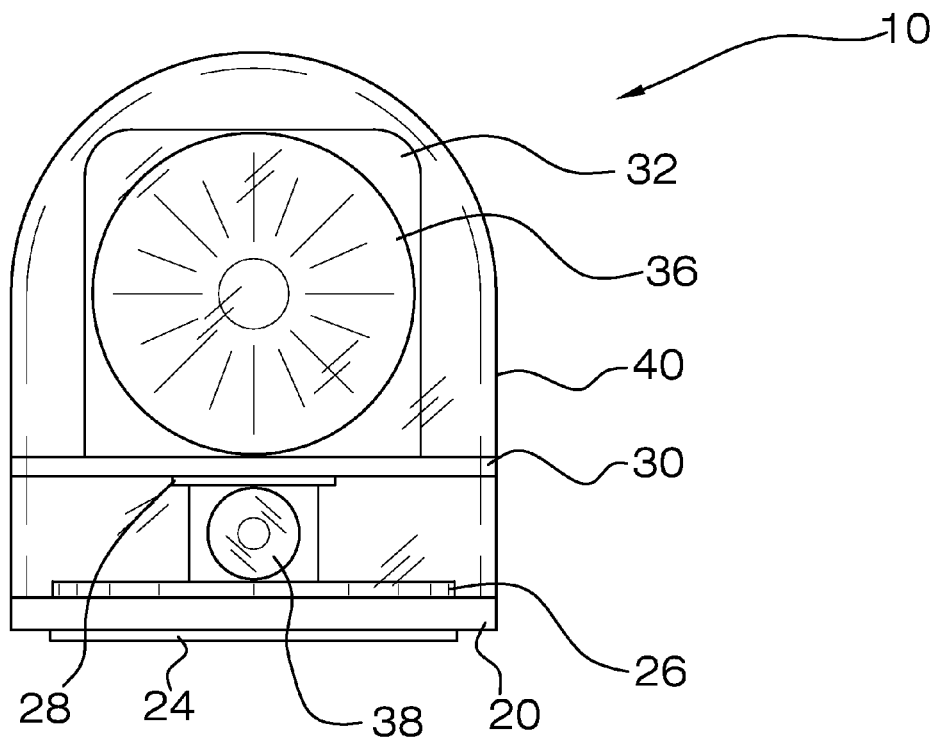
FIG. 3 is a front elevation view.
Figure 4:
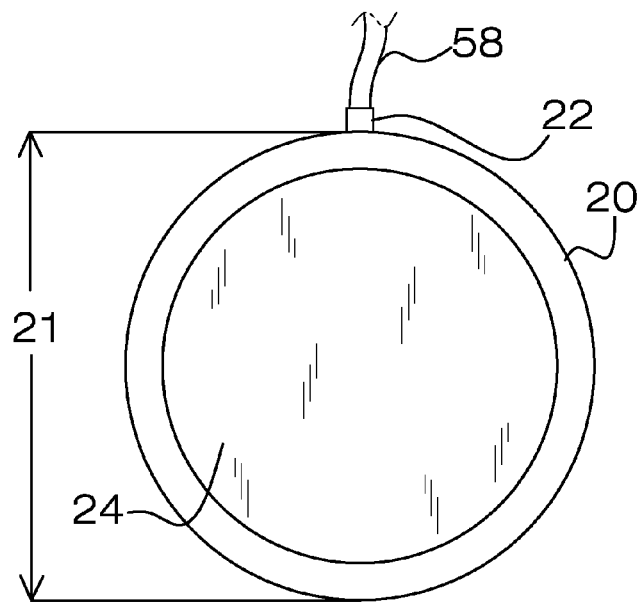
FIG. 4 is a bottom plan view.
Figure 5:
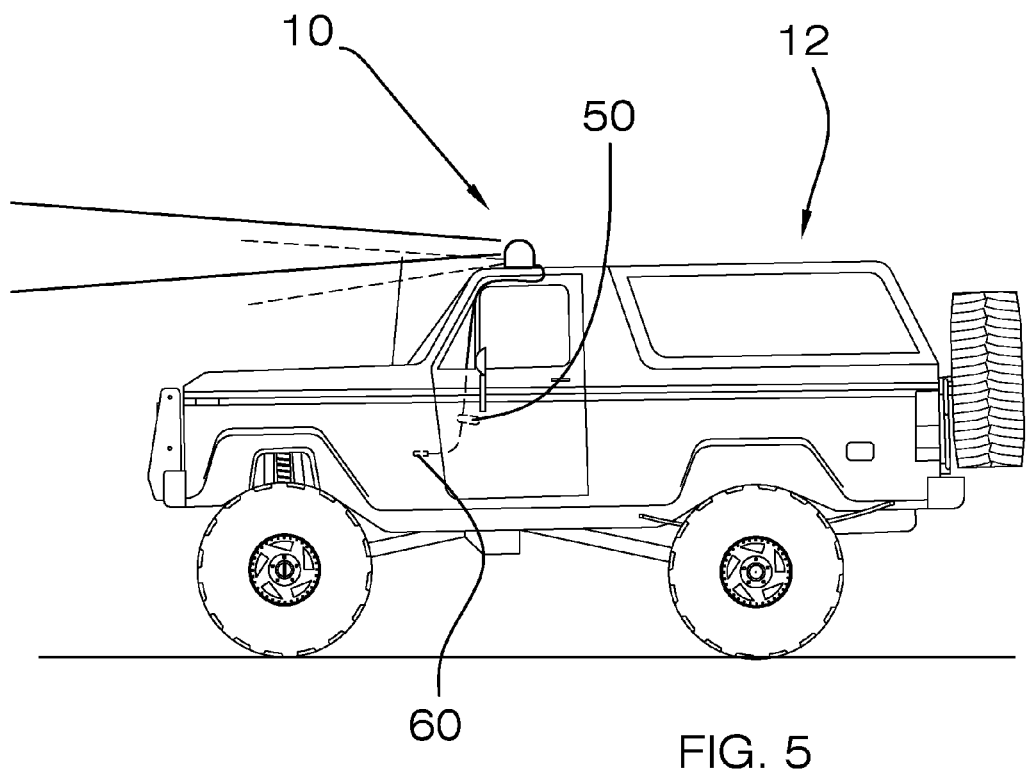
FIG. 5 is a lateral elevation view of the apparatus removably affixed to the roof of a vehicle.

Referring now to FIG. 3 and continuing to refer to FIGS. 1 and 2, the circular spinning base 26 is disposed within the dome 40. The spinning base 26 is disposed rotatably atop the circular base 20. The caution light 38 is affixed atop the spinning base 26. The caution light support 28 is disposed between the caution light 38 and the stationary base 30. The caution light 38 is rotatably supported by the caution light support 28. The cigar lighter plug 60 is affixed to the connecting wire 58. The control 50 is disposed in the connecting wire 58. The control 50 is disposed between the grommet 22 and the cigar lighter plug 60. The control 50 further comprises a caution light on/off 54, a spotlight on/off 52, and the both lights on/off 56 for both the caution light 38 and spotlight 36. The connecting wire 58 is in communication with the spotlight 36, the spinning base 26, and the caution light 38.

Figure 6:
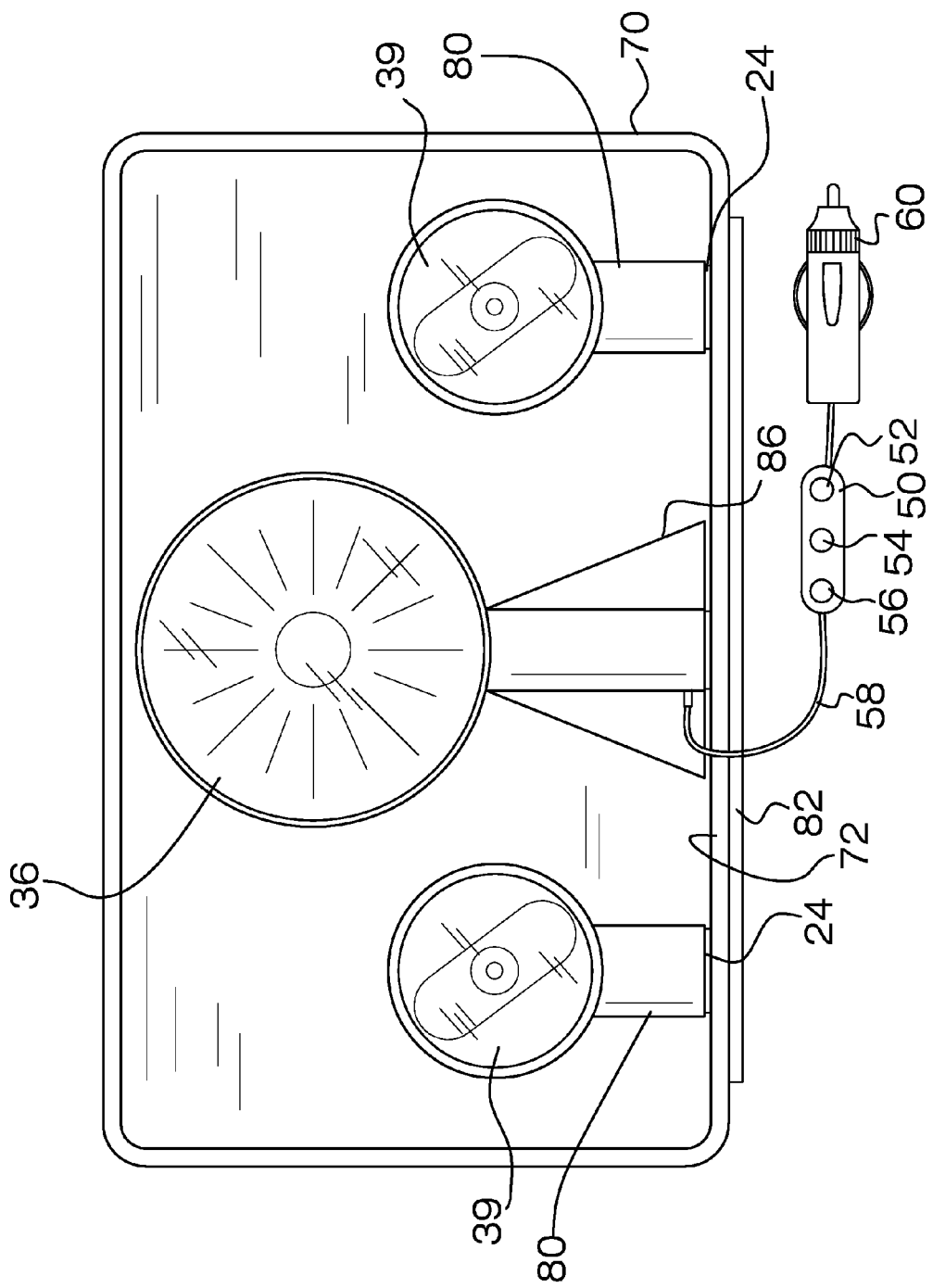
FIG. 6 is a front elevation view of an alternate embodiment.

Referring to FIG. 6, the alternate embodiment of the combined spotlight caution light apparatus 10 comprises a transparent rectangular housing 70 having a housing floor 72. A magnetic attachment 82 is attached below the housing floor 72. The magnetic attachment 82 removably affixes to an existing vehicle 12. The winged spotlight base 86 is centrally disposed within the rectangular housing 70. The pair of spaced apart caution light bases 80 is disposed within the housing 70. Each caution light base 80 is disposed on an either side of the winged spotlight base 86. Each caution light base 80 is affixed to the housing floor 72 via a magnet 24. A spinning caution light 39 is affixed atop one of each caution light base 80. The connecting wire 58 is extended from the rectangular housing 70. The connecting wire 58 is in communication with the spinning caution lights 39 and the spotlight 36. The cigar lighter plug 60 is affixed to the connecting wire 58. The control 50 is disposed in the connecting wire 58. The control 50 is disposed between the winged spotlight base 86 and the cigar lighter plug 60. The control 50 further comprises the caution light on/off 54, the spotlight on/off 52, and the both lights on/off 56 for both caution light 38 and spotlight 36.

With respect to the above description then, it is to be realized that the optimum dimensional relationships for the parts of the combined spotlight caution light apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the combined spotlight caution light apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the combined spotlight caution light apparatus may be used.

Therefore, the foregoing is considered as illustrative only of the principles of the combined spotlight caution light apparatus. Further, since numerous modifications and changes will readily occur to those skilled in the art, it is not desired to limit the combined spotlight caution light apparatus to the exact construction and operation shown and described, and accordingly, all suitable modifications and equivalents may be resorted to, falling within the scope of the combined spotlight caution light apparatus.

What is claimed is:

1. A combined spotlight caution light apparatus, comprising, in combination:
   a circular base having a base diameter of about 12 inches;
   a circular magnet attached below the base, the magnet removably affixed to an existing vehicle;
   a connecting wire extended from the circular base;
   a grommet reinforcement disposed on the connecting wire at the circular base;
   a transparent circular dome having a rounded top disposed atop the circular base, the circular dome having a dome diameter of about 12 inches, a dome height of about 12 inches;
   a circular stationary upper base disposed within the circular dome, the stationary upper base spaced apart from the circular base;
   a hexahedral spotlight surround disposed atop the stationary upper base, the surround having a surround front spaced apart from a surround back;
   a plurality of spaced apart heat vents disposed in the surround back;
   a spotlight disposed in the surround front;
   a circular spinning base disposed within the dome, the spinning base rotatably disposed atop the circular base;
   a caution light affixed atop the spinning base;
   a caution light support disposed between the caution light and the stationary base, the caution light rotatably supported by the caution light support;
   a cigar lighter plug affixed to the connecting wire;
   a control disposed in the connecting wire, the control disposed between the grommet and the cigar lighter plug, the control wire in communication with the spotlight, the spinning base, and the caution light, the control further comprising:
      a caution light on/off electrical switch in operational communication with the spinning base, wherein the spinning base rotates upon activation of the caution light on/off switch;
      a spotlight on/off electrical switch in operational communication with the spotlight, wherein the spotlight activates and alternately deactivates upon activation and alternate deactivation of the spotlight on/off switch in an on-position and an alternate off-position;
      a both lights on/off electrical switch in operational communication with both the caution light and the spotlight, wherein the spinning base rotates and the spotlight activates upon the activation of the both light on/off switch.

2. A combined spotlight caution light apparatus, comprising, in combination:
   a transparent rectangular housing having a housing floor;
   a magnetic attachment attached below the housing floor, the magnetic attachment removably affixed to an existing vehicle;
   a winged spotlight base centrally disposed in the rectangular housing;
   a pair of spaced apart caution light bases disposed within the housing, each caution light base disposed on an either side of the winged spotlight base, each caution light base affixed to the housing floor via a magnet;
   a spinning caution light affixed atop one of each caution light base;
   a connecting wire extended from the rectangular housing, the connecting wire in communication with the spinning caution lights and the spotlight;
   a cigar lighter plug affixed to the connecting wire;

a control disposed in the connecting wire, the control disposed between the grommet and the cigar lighter plug, the control further comprising:
- a caution light on/off electrical switch in operational communication with the spinning base, wherein the spinning base rotates upon activation of the caution light on/off switch;
- a spotlight on/off electrical switch in operational communication with the spotlight, wherein the spotlight activates and alternately deactivates upon activation and alternate deactivation of the spotlight on/off switch in an on-position and an alternate off-position;
- a both lights on/off electrical switch in operational communication with both the caution light and the spotlight, wherein the spinning base rotates and the spotlight activates upon the activation of the both light on/off switch.

* * * * *